(12) United States Patent
Keene

(10) Patent No.: US 8,647,734 B2
(45) Date of Patent: Feb. 11, 2014

(54) DRAINAGE MAT

(75) Inventor: James R. Keene, Pepper Pike, OH (US)

(73) Assignee: Keene Building Products Co., Inc., Mayfield Heights, OH (US)

( * ) Notice: Subject to any disclaimer, the term of this patent is extended or adjusted under 35 U.S.C. 154(b) by 154 days.

(21) Appl. No.: 13/007,755

(22) Filed: Jan. 17, 2011

(65) Prior Publication Data
US 2012/0183746 A1 Jul. 19, 2012

(51) Int. Cl.
B32B 7/02 (2006.01)

(52) U.S. Cl.
USPC .......................................... 428/193; 428/218

(58) Field of Classification Search
USPC .................................. 428/193, 218
See application file for complete search history.

(56) References Cited

U.S. PATENT DOCUMENTS

| | | | |
|---|---|---|---|
| 1,434,915 A | 11/1922 | Scholfield | |
| 1,799,750 A | 4/1931 | Hummert | |
| 2,104,872 A | 1/1938 | Levy | |
| 3,423,284 A | 1/1969 | Marek et al. | |
| 3,435,577 A | 4/1969 | O'Leary | |
| 4,177,312 A | 12/1979 | Rasen et al. | |
| 4,211,807 A | 7/1980 | Yazawa et al. | |
| 4,558,552 A | 12/1985 | Reitter, II | |
| 4,617,219 A | 10/1986 | Schupack | |
| 4,815,963 A | 3/1989 | Berkhout | |
| 5,596,853 A | 1/1997 | Bianey et al. | |
| 5,839,241 A | 11/1998 | Cacossa et al. | |
| 6,151,855 A | 11/2000 | Campbell | |
| 6,171,984 B1 | 1/2001 | Paulson et al. | |
| 6,355,333 B1 | 3/2002 | Waggoner et al. | |
| 6,594,965 B2 | 7/2003 | Coulton | |
| 6,745,531 B1 | 6/2004 | Egan | |
| 6,804,922 B1 | 10/2004 | Egan | |
| 6,901,713 B2 | 6/2005 | Axsom | |
| 6,918,218 B2 | 7/2005 | Greenway | |
| 6,990,775 B2 | 1/2006 | Koester | |
| 7,070,678 B2 * | 7/2006 | Allen et al. | 162/109 |
| 7,338,700 B2 * | 3/2008 | McKenna et al. | 428/174 |
| 7,607,270 B2 | 10/2009 | Ehrman et al. | |
| 7,655,104 B2 * | 2/2010 | McKenna et al. | 156/209 |
| 2002/0170648 A1 | 11/2002 | Dinkel | |
| 2004/0025465 A1 | 2/2004 | Aldea et al. | |
| 2004/0182028 A1 | 9/2004 | Belleau | |
| 2005/0136225 A1 * | 6/2005 | McKenna et al. | 428/174 |
| 2005/0144901 A1 | 7/2005 | Egan et al. | |
| 2005/0183346 A1 | 8/2005 | Dudley et al. | |
| 2006/0051560 A1 * | 3/2006 | McKenna et al. | 428/174 |
| 2007/0261365 A1 | 11/2007 | Keene | |
| 2009/0320399 A1 | 12/2009 | Ehrman et al. | |

OTHER PUBLICATIONS

U.S. Appl. No. 13/007,774, filed Jan. 2011, Keene.

* cited by examiner

Primary Examiner — David Sample
Assistant Examiner — Tahseen N Khan
(74) Attorney, Agent, or Firm — Renner, Otto, Boisselle & Sklar, LLP

(57) ABSTRACT

A drainage mat for use in building structures, particularly in exterior walls and roofing, to improve drainage and ventilation within such structures. The drainage mat includes a web of extruded polymer monofilaments that are heat welded at junctions to form a matrix of tangled monofilaments. The web has a uniform thickness and includes alternating rows of high filament density and low filament density.

15 Claims, 3 Drawing Sheets

DRAINAGE MAT

TECHNICAL FIELD

The present invention relates to drainage and ventilation mats for use in building structures, particularly in exterior walls and roofing.

BACKGROUND

In exterior walls of building structures, such as houses or commercial buildings, there are a number of locations within the building structure where ambient moisture-laden air may become relatively trapped in still air. In time, the trapped moisture-laden air may condense in droplets or drops on adjacent surfaces of masonry, wood or metal which may not be visible to an observer or exposed for treatment. There has been substantial development of devices and arrangements for leading moisture away from relatively trapped areas in masonry and other types of building construction in an effort to overcome this problem.

SUMMARY

In one aspect of the invention there is provided a drainage mat that includes a web of extruded polymer monofilaments, the polymer monofilaments being heat welded at junctions to form a matrix of tangled monofilaments, the web having a machine direction and a cross-direction, a front face, a rear face side and side edges. The web has a uniform thickness and includes alternating rows of high filament density and low filament density extending in the cross-direction. The high filament density rows have at least 10% greater deflection resistance than the low filament density rows.

In one embodiment, the drainage mat further includes a mesh layer heat bonded to the rear face of the web.

In one embodiment, the rows of low filament density include between about 10% to about 95% of the area of the web in the machine direction. In another embodiment, the rows of low filament density include between about 25% to about 50% of the area of the web in the machine direction.

The polymer monofilaments may be made of a material selected from polyolefin, polyamide, polyester, polyvinylhalide, polystyrene, polyvinylester and a mixture of two or more thereof. In one embodiment, the polymer monofilaments are made of polyethylene, polypropylene, or a mixture thereof.

In one embodiment, the mesh layer includes a plurality of fiberglass strands.

The polymer monofilaments of the web may have an average diameter in the range from about 1 to about 4 mils.

The polymer monofilaments of the low filament density rows may intersect the polymer monofilaments of the high filament density rows.

In one embodiment, the rows of high filament density and low filament density extend only in the cross direction.

The drainage mat may further include a waterproof membrane bonded to the front face of the web.

In one embodiment, the mesh layer includes a selvedge edge that extends beyond the side edges of the web.

At least one of the side edges of the web may have an entangled filament hook.

In an aspect of the invention, a drainage system includes at least two adjacent drainage mats. The at least two adjacent drainage mats may be interlocked at adjacent side edges with the entangled filament hooks.

BRIEF DESCRIPTION OF THE DRAWINGS

In the annexed drawings like parts and features have like references. The drawings are schematic illustrations which may not necessarily be drawn to scale.

DETAILED DESCRIPTION

All numerical ranges disclosed in the specification and claims may be combined in any manner. It is to be understood that unless specifically stated otherwise, references to "a," "an," and/or "the" may include one or more than one, and that reference to an item in the singular may also include the item in the plural. All combinations specified in the claims may be combined in any manner.

The term "machine direction" refers to the direction of the flow of polymer from an extruder when forming the inventive drainage mat.

The term "cross-direction" refers to the direction that is oriented 90° from the machine direction.

Figure 1:
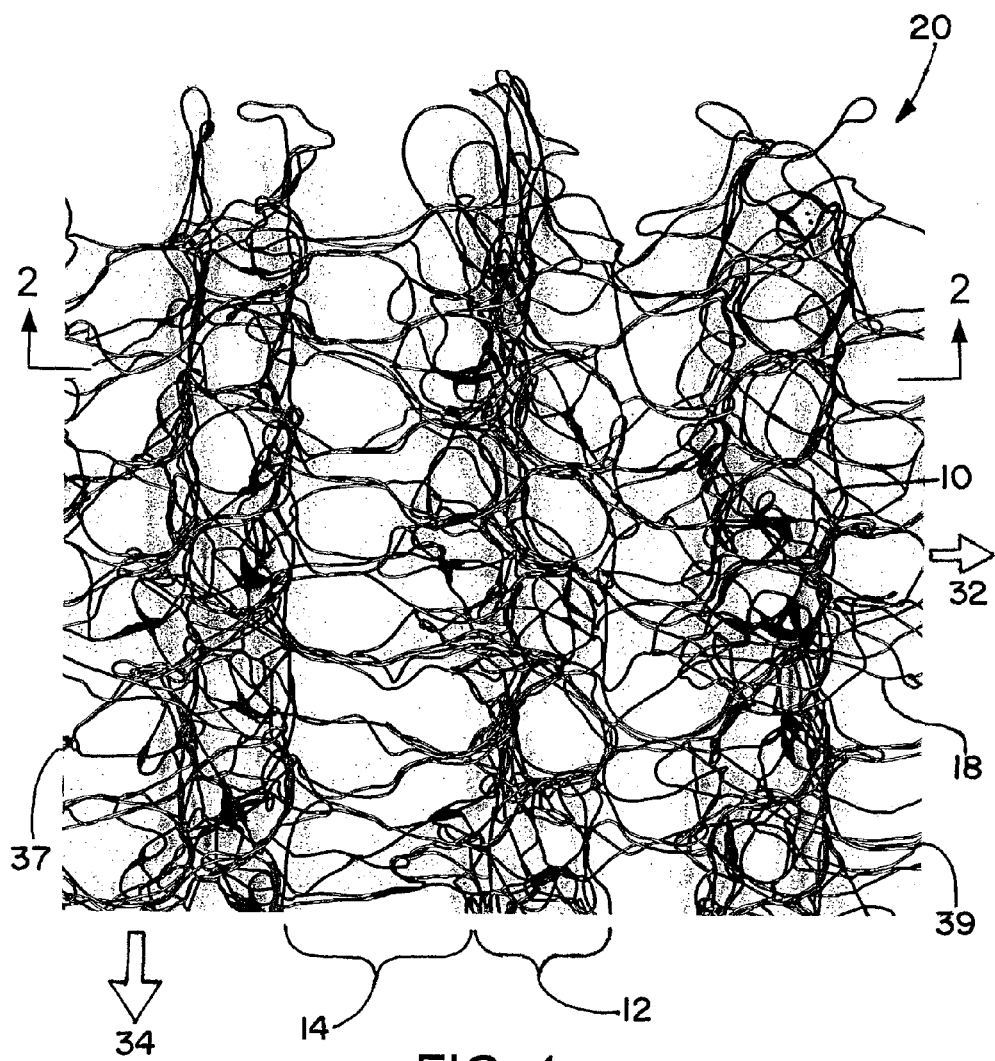
FIG. 1 is a schematic view of a portion of the front face of a drainage mat according to an embodiment of the present invention.
Figure 2:
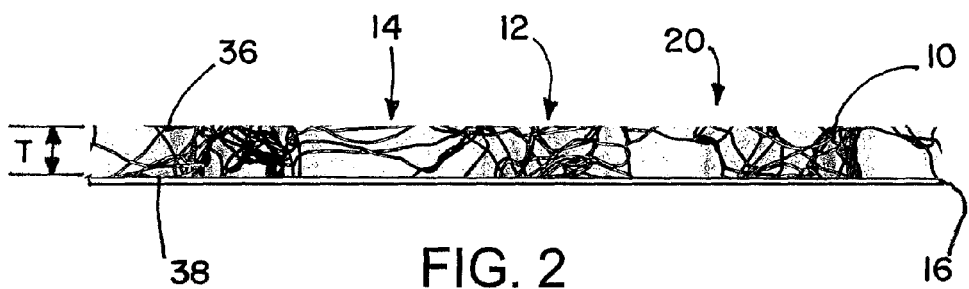
FIG. 2 is a cross-sectional view of the drainage mat illustrated in FIG. 1.

Referring to FIGS. 1 and 2, the inventive drainage mat 20, in its illustrated embodiment, includes a web 10 of extruded polymer monofilaments 18. The web has a machine direction, which is indicated by the arrow 32, and a cross-direction, which is indicated by the arrow 34. The machine direction 32 is the direction in which polymer monofilaments 18 used to make the web 10 flow out of an extruder and onto a substrate during the formation of the mat 20. The cross-direction 34 is the direction that is oriented 90° from the machine direction 32.

The web 10 is formed from a plurality of the extruded polymer monofilaments 18. The monofilaments 18 are heat welded at junctions to form a matrix of the polymer monofilaments 18. The web 10 has a front face 36, a rear face 38, and side edges 37 and 39. The web 10 includes alternating rows of high filament density 12 and low filament density 14 extending in the cross-direction 34. The thickness "T" of the web 10 is uniform across both the machine direction 32 and the cross-direction 34.

The rows of high filament density 12 create areas of high structural support, while the rows of low filament density 14 create areas for greater drainage levels and ventilation levels. In one embodiment, the rows of high filament density 12 have at least about 10% greater deflection resistance than the rows of low filament density 14. In one embodiment, the rows of high filament density 12 have about 25% to about 50% greater structural compression resistance than the rows of low filament density 14.

The rows of low filament density 14 create channels within the mat 20 for increased flow of water and/or air. In one embodiment, the channels comprise between about 10% to about 95% of the area of the web 10 in the machine direction. Preferably, the channels comprise between about 25% to about 50% of the area of the web 10. In one embodiment, the rows of low filament density 14 can be repeated at a minimum of about every one inch (1 in) and up to about every six inches (6 in.). Preferably, the rows of low filament density 14 can be repeated about every one inch (1 in) to about every four inches (4 in.). The polymer monofilaments of the low filament density rows intersect the polymer monofilaments of the high filament density rows.

The web 10 may have a thickness T in the range from about 0.1 to about 1 inch, and in one embodiment from about 0.2 to about 0.8 inch. The web 10 may have from about 25 to about 400 polymer monofilaments 18 per foot as measured along the cross-direction 34 of the web 10, and in one embodiment from about 75 to about 150 polymer monofilaments 18 per foot. The polymer monofilaments 18 may have an average diameter in the range from about 1 to about 4 mils, and in one embodiment from about 2 to about 3 mils.

The web 10 may be made from any thermoplastic polymer that provides the desired properties of strength and resilience when used in the inventive drainage mat. The web 10 may be made of a polyolefin (e.g., polyethylene, polypropylene, etc.), polyamide (e.g., Nylon), polyester, polyvinylhalide (e.g., polyvinylchloride (PVC), polyvinylidene chloride, polyvinyltetrafluoride, polyvinyl chlorotrifluoride), polystyrene, polyvinylester (e.g., polyvinyl acetate, etc.) or a mixture of two or more thereof.

The drainage mat 20 may include a mesh layer 16 adjacent the rear face 38 of the web 10. The mesh layer 16 is preferably constructed of fiberglass or a similar material, even more preferably a material displaying resistance to environmental exposure (e.g., alkaline conditions, and the like). In one embodiment, the mesh layer 16 includes a fiberglass layer and a polymer coating. The fiberglass layer may be a woven layer. The fiberglass layer has a plurality of fiberglass strands extending parallel to one another in the machine direction 32, and a plurality of fiberglass strands extending parallel to one another in the cross-direction 34. The fiberglass strands intersect one another at angles of about 90°. The strands may be referred to as yarns. The strands may be aligned in a side-by-side configuration or in an over/under configuration. The polymer coating provides a binding to hold the strands together in the mesh layer 16.

The fiberglass strands may each comprise a plurality of fiberglass filaments. The fiberglass filaments may be combined with filaments of another material, for example, a polymer such as polyester. The average diameter of the fiberglass strands may be in the range from about 10 to about 200 mils, and in one embodiment in the range from about 20 to about 40 mils. The number of fiberglass strands extending in the machine direction 32 may be in the range from about 1 to about 20 strands per inch of mesh layer 16 as measured in the cross-direction 34, and in one embodiment in the range from about 6 to about 10 strands per inch, and in one embodiment about 7 or 8 strands per inch. The number of fiberglass strands extending in the cross-direction 34 may be in the range from about 1 to about 20 strands per inch of mesh layer 16 as measured in the machine direction 32, and in one embodiment in the range from about 6 to about 10 strands per inch of mesh layer as measured in the machine direction 32, and in one embodiment about 7 or about 8 strands per inch.

The process for making the drainage mat 20 may include the steps of extruding the polymer monofilaments 18 onto a substrate to form the web 10. The polymer monofilaments 18 may become entangled and heat welded to form a matrix of tangled monofilaments. The mesh layer 16 may then be placed in contact with the web 10 while the web 10 is in a sufficiently tacky state to allow the web 10 to be heat welded to the mesh layer 16.

In one embodiment, the web 10 is manufactured using a circular oscillation during production. Typically, the line rate and the oscillation rate are matched to produce a uniformly consistent mat. In a preferred embodiment, the oscillation rate is lowered or enhanced to create points of strength and areas of minimal material. The enhancement results in a mat having greater compression resistance overall, while creating channels for greater drainage and ventilation. This enhanced oscillation method of a circular oscillation is much different than the typical oscillation method which is simply side to side, or uni-directional. The use of a side to side oscillation method produces a uniform mat when the conveyor continually functions at the same line speed. In order to make this mat on a linear oscillating table, the line speed is varied on the belt.

The drainage mat 20 may be supplied in the form of a roll to facilitate transport of the mat 20 and installation of the mat at the job site. When forming the roll, the mat 20 may be rolled in the machine direction 32. The mesh layer 16 may be on the outside when the mat 10 is rolled, or alternatively, the mesh layer 16 may be on the inside. The diameter of the roll may be of any dimension suitable for providing the desired length of mat 20.

Alternatively, the drainage mat 20 may be supplied in the form of cut rectangular panels.

Figure 3:
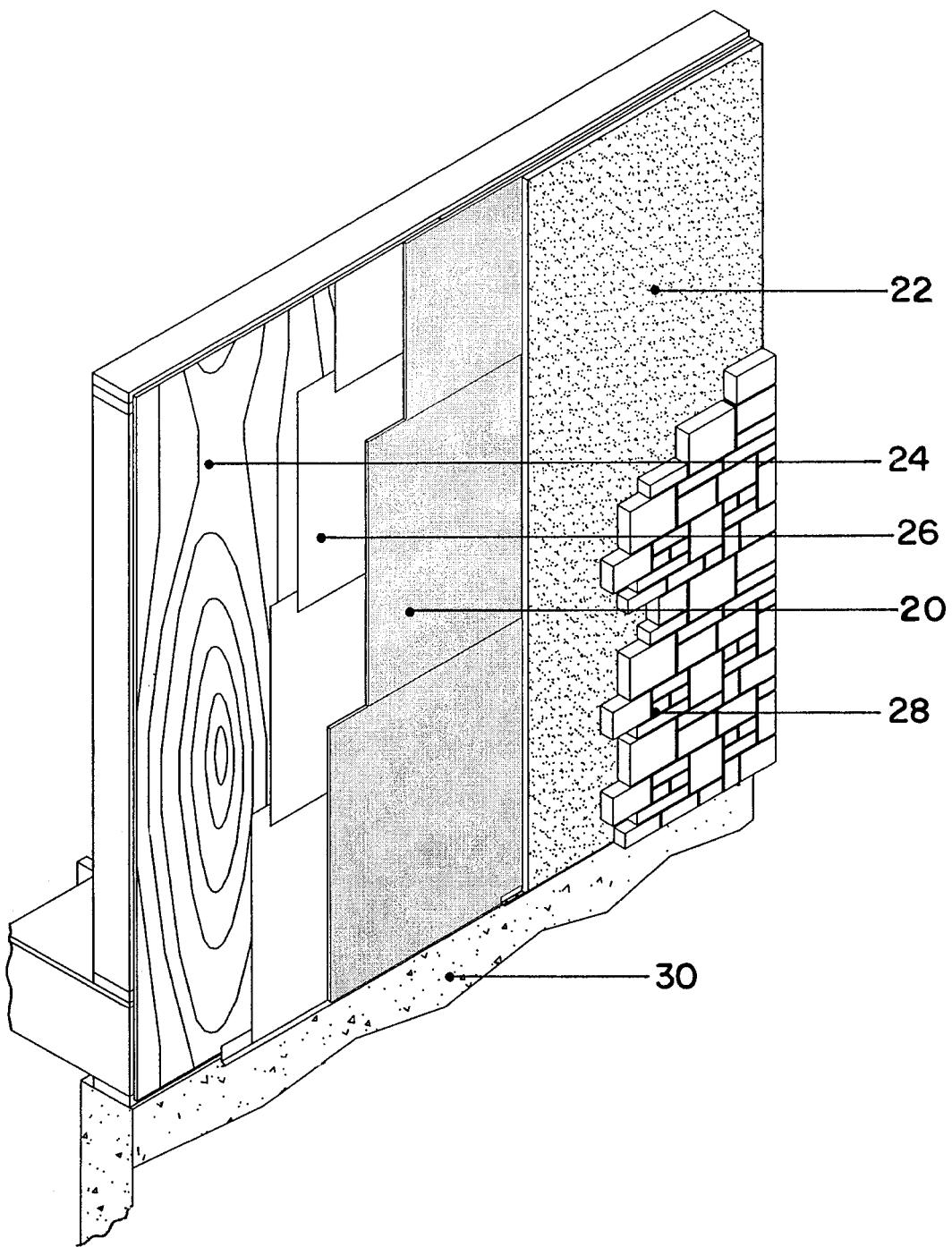
FIG. 3 is a perspective view of an exterior wall construction for a building incorporating the drainage mat according to an embodiment of the present invention.

Referring to FIG. 3, an exterior wall assembly of a building includes drainage mat 20 for providing ventilation and drainage passageways for the free flow of air, vapor and liquids to ensure that moisture is prevented from accumulating. The wall assembly includes sheathing 24, which is typically made of plywood, panels of particle board or strand board, or an insulated concrete wall. The sheathing 24 may be lined with a weather resistive barrier 26, such as a vapor permeable house-wrap. The drainage mat 20 is installed so that the mesh layer 16 faces away from the sheathing 24. In the illustrated embodiment, a mortar bed 22 overlies the drainage mat 20 and manufactured stone 28 is affixed to the mortar bed 22. Other exterior veneer materials may be used, including brick, stucco, natural stone or plank siding.

Figure 4:
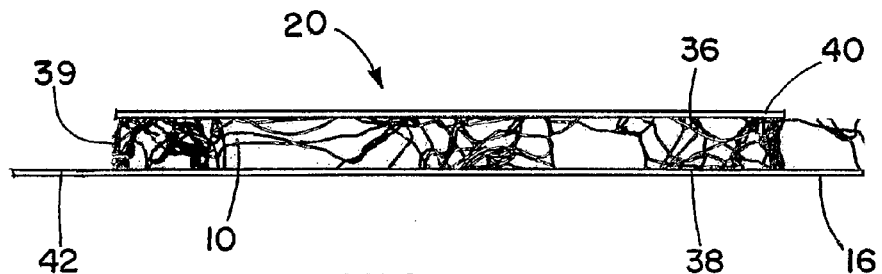
FIG. 4 is a cross-sectional view of an embodiment of the drainage mat that includes a waterproof membrane.

Referring to FIG. 4, the drainage mat 20 may include a waterproof membrane 40 adjacent the front face 36 of the web 10. The waterproof membrane 40 may be used alone on the web 10, or may be used together with the mesh layer 16 on the opposite face of the web 10. The waterproof membrane 40 may be both liquid and moisture vapor impermeable. Alternatively, the membrane 40 may be a breathable membrane that is impermeable to liquid.

In one embodiment, the drainage mat 20 is bonded to a mesh layer 16 having a width that is greater than the width of the monofilament web 10 to create a selvedge edge 42 on one or both of web side edges 37 and 39.

Figure 5:
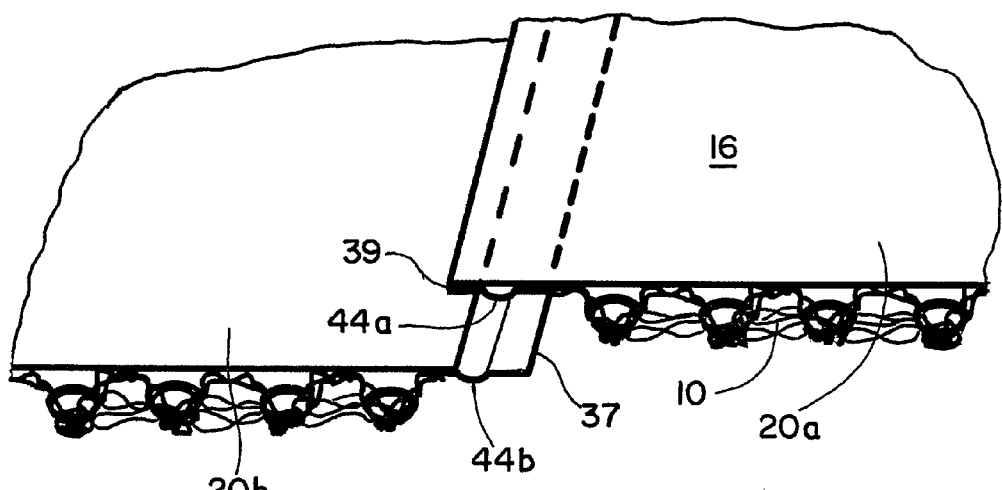
FIG. 5. is a perspective view of two drainage mats that include interlocking filament hooks.
Figure 6:
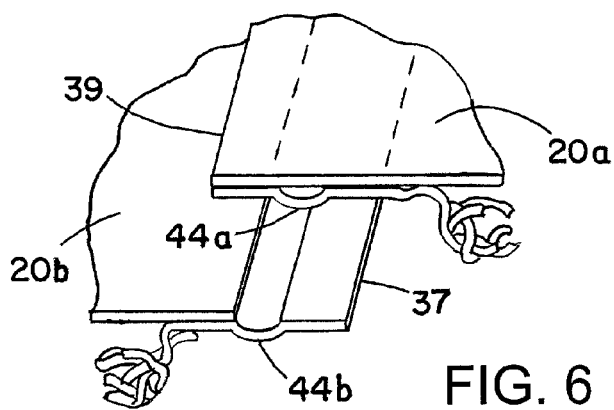
FIG. 6 is an enlarged view of the interlocking filament hooks of FIG. 5.

Referring to FIGS. 5 and 6, the drainage mat 20 may include entangled monofilament hooks 44 at one or more of web side edges 37 and 39. The hooks 44 allow adjacent drainage mats to interlock to secure the drainage mats in place within the drainage system installation. The monofilament hooks 44a on a first mat 20a, when aligned with and pressed into the monofilament hooks 44b of an adjacent second mat 20b, become entangled to secure the first mat 20a to the second mat 20b.

In addition to its usefulness as a drainage mat, the polymer monofilament web described herein may be used in applications such as roofing ventilation, erosion control, foundation drainage and sound control.

While the invention has been explained in relation to various embodiments, it is to be understood that various modifications thereof will become apparent to those skilled in the art upon reading this specification. Therefore, it is to be understood that the invention provided herein is intended to cover such modifications as may fall within the scope of the appended claims.

The invention claimed is:

1. A drainage mat comprising:
a web of extruded polymer monofilaments, the polymer monofilaments being heat welded at junctions to form a matrix of tangled monofilaments, the web having a machine direction and a cross-direction, a front face, a rear face and side edges, the web having a uniform thickness and configured to have alternating rows of high filament density and low filament density extending in the cross-direction, wherein the high filament density rows have at least 10% greater deflection resistance than the low filament density rows and wherein the low filament density rows form a plurality of channels in the drainage mat.

2. The drainage mat of claim 1 wherein the rows of low filament density comprise between about 10% to about 95% of the area of the web in the machine direction.

3. The drainage mat of claim 1 wherein the rows of low filament density comprise between about 25% to about 50% of the area of the web in the machine direction.

4. The drainage mat of claim 1 wherein the polymer monofilaments are made of a material selected from polyolefin, polyamide, polyester, polyvinylhalide, polystyrene, polyvinylester and a mixture of two or more thereof.

5. The drainage mat of claim 1 wherein the polymer monofilaments are made of a material selected from polyethylene, polypropylene, and a mixture thereof.

6. The drainage mat of claim 1 wherein the polymer monofilaments have an average diameter in the range from about 1 to about 4 mils.

7. The drainage mat of claim 1 wherein the polymer monofilaments of the low filament density rows intersect the polymer monofilaments of the high filament density rows.

8. The drainage mat of claim 1 wherein the rows of high filament density and low filament density extend only in the cross direction.

9. The drainage mat of claim 1 further comprising a waterproof membrane bonded to the front face of the web.

10. The drainage mat of claim 1 wherein at least one of the side edges of the web has an entangled filament hook.

11. The drainage mat of claim 1 further comprising a mesh layer heat bonded to the rear face of the web.

12. The drainage mat of claim 11 wherein the mesh layer comprises a plurality of fiberglass strands.

13. The drainage mat of claim 11 wherein the mesh layer includes at least one selvedge edge that extends beyond at least one of the side edges of the web.

14. A drainage system comprising at least two adjacent drainage mats in accordance with claim 1.

15. The drainage system of claim 14 wherein the at least two adjacent drainage mats each have an interlocking edge member.

* * * * *